United States Patent
Nah

(10) Patent No.: US 9,823,793 B2
(45) Date of Patent: Nov. 21, 2017

(54) TOUCH WINDOW

(71) Applicant: LG INNOTEK CO., LTD., Seoul (KR)

(72) Inventor: Hyun Min Nah, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 21 days.

(21) Appl. No.: 14/574,742

(22) Filed: Dec. 18, 2014

(65) Prior Publication Data

US 2015/0169110 A1   Jun. 18, 2015

(30) Foreign Application Priority Data

Dec. 18, 2013 (KR) .................. 10-2013-0158723

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01)

(58) Field of Classification Search
CPC ................ G06F 3/044; G06F 2203/04103
USPC ....................................... 345/156
See application file for complete search history.

(56) References Cited

U.S. PATENT DOCUMENTS

| 2012/0113021 | A1* | 5/2012 | Liu | G06F 3/041 345/173 |
| 2012/0147472 | A1* | 6/2012 | Kajiya | B32B 3/30 359/601 |
| 2012/0234663 | A1* | 9/2012 | Hwang | G06F 3/044 200/600 |
| 2013/0016054 | A1* | 1/2013 | Cheong | G06F 3/044 345/173 |
| 2013/0021303 | A1* | 1/2013 | Martin | G06F 1/3262 345/178 |
| 2013/0063820 | A1* | 3/2013 | Yang | G06F 3/044 359/585 |
| 2014/0246225 | A1* | 9/2014 | Mizuno | G06F 3/044 174/255 |

FOREIGN PATENT DOCUMENTS

JP       2010015861 A   *  1/2010
KR  10-2012-0127984 A      11/2012
KR  10-2013-0028623 A       3/2013

* cited by examiner

*Primary Examiner* — Kent Chang
*Assistant Examiner* — Mark Edwards
(74) *Attorney, Agent, or Firm* — KED & Associates, LLP

(57) ABSTRACT

A touch window includes a substrate, and a sensing electrode on the substrate. The sensing electrode includes a first sensing electrode and a second sensing electrode, an insulating layer between the first and second sensing electrodes, and a visibility protective layer on the sensing electrode. A difference between refractive indexes of the sensing electrode and the visibility protective layer is less than a difference between refractive indexes of the sensing electrode and the insulating layer.

15 Claims, 6 Drawing Sheets

TOUCH WINDOW

CROSS-REFERENCE TO RELATED APPLICATION

This application claims priority under 35 U.S.C. §119 to Korean Application No. 10-2013-0158723 filed on Dec. 18, 2013, whose entire disclosure is incorporated herein by reference.

BACKGROUND

1. Field

The disclosure relates to a touch window.

2. Background

Recently, a touch panel, which performs an input function through the touch of an image displayed on a display device by an input device, such as a stylus pen, or a finger has been applied to various electronic appliances. Such a touch panel may be typically classified into a resistive touch panel and a capacitive touch panel. In the resistive touch panel, glass is shorted with an electrode due to the pressure of the input device so that a touch point is detected. In the capacitive touch panel, the position of the touch point is detected by detecting the variation in capacitance between electrodes when a finger of the user is touched on the capacitive touch panel.

In the resistive type touch panel, the repeated use thereof may degrade the performance thereof, and cause scratches. There is an interest for the capacitive type touch panel having superior endurance and having a long lifespan is increased.

When an electrode pattern is implemented in the touch panel, due to a difference between the refractive indexes of an electrode formed area and an electrode unformed area, the electrode pattern may be seen. Such visible pattern deteriorates an outer appearance quality.

BRIEF DESCRIPTION OF THE DRAWINGS

The embodiments will be described in detail with reference to the following drawings in which like reference numerals refer to like elements wherein.

DETAILED DESCRIPTION

Figure 1:
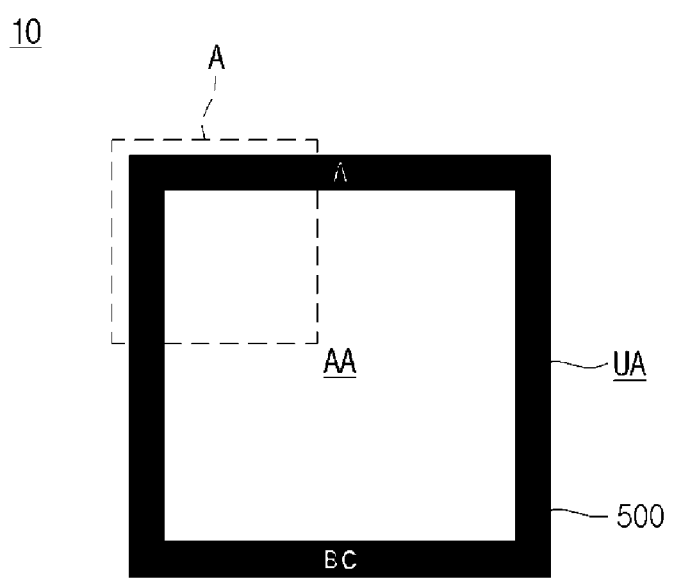
FIG. 1 is a schematic plane view showing a touch window according to one embodiment.
Figure 2:
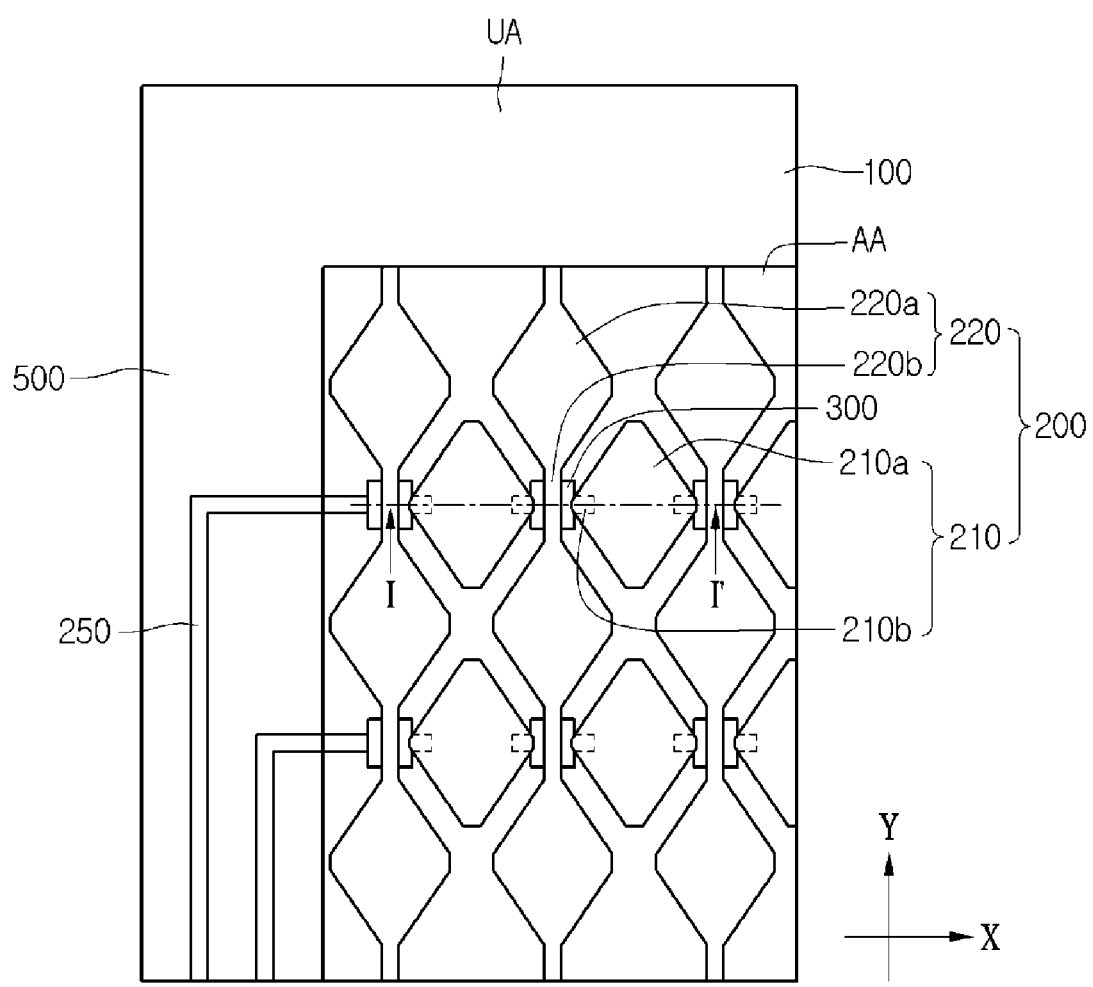
FIG. 2 is an enlarged view showing port A in FIG. 1.
Figure 3:
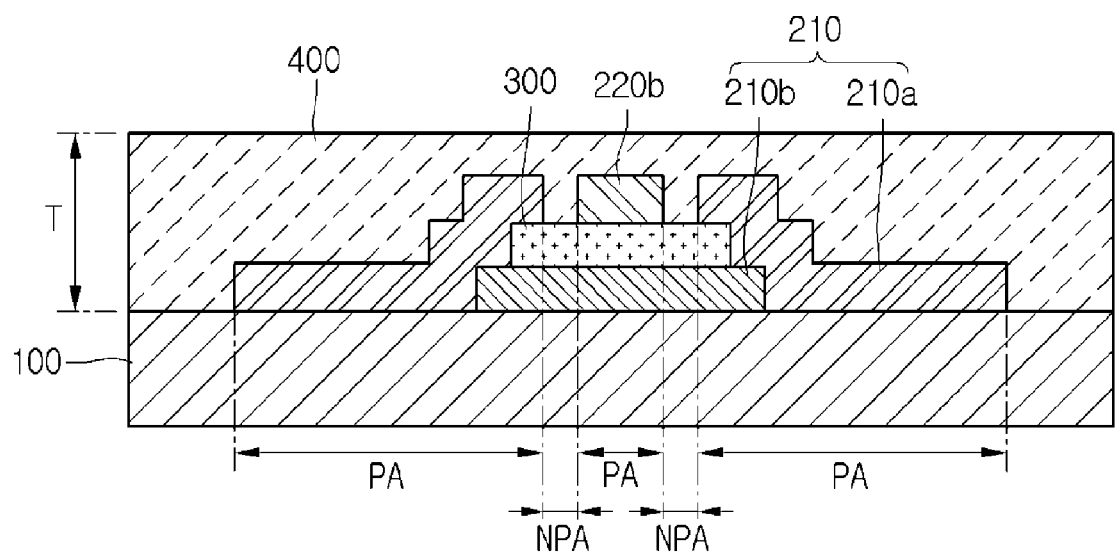
FIG. 3 is a sectional view taken along line I-I' of FIG. 1.

Referring to FIGS. 1 and 2, a touch window 10 includes a substrate 100 having an active area AA, in which a position of an input device (e.g., finger) is sensed, and an unactive area UA provided at a peripheral portion of the active area AA. When an input device such as a finger is touched onto such a touch window, the difference in capacitance is made on a touched portion by the input device, and the touched portion representing the difference in capacitance may be detected as a touch point.

Sensing electrodes 200 may be formed in the active area AA such that the input device may be sensed. Wires 250 electrically connecting the sensing electrodes 200 to each other may be formed in the unactive area UA. An external circuit connected to the wires 250 may be placed in the unactive area UA.

The substrate 100 may be formed of various materials capable of supporting the sensing electrode 200, the wire 250 and a circuit substrate which are formed on the substrate 100. The substrate 100 may include a glass substrate 100, and/or a plastic substrate including polyethylene terephthalate (PET) film or resin. A direct touch of an input device such as a pen, or a finger may be performed through the substrate 100. The substrate 100 may include a cover glass.

A printing layer 500 is formed in the unactive area UA of the substrate 100. The printing layer 500 may be coated with a material having a predetermined color so that the wires 250 and a printed circuit board for connecting the wires 250 to external circuits may not be visible from the outside. The printing layer 500 may have a color suitable for a desired outer appearance thereof. For example, the printing layer 500 may include black pigments to represent black. A desired logo may be also formed in the printing layer 500 through various schemes. The printing layer 500 may be formed through deposition, print, and wet coating schemes.

The sensing electrode 200 may include first and second electrodes 210 and 220. The first electrode 210 includes first sensor parts 210a to sense the touch of the input device such as the finger and a first connection part 210b to connect the first sensor parts 212a with each other. The first sensor parts 210a may be formed in a first direction (X axis direction of drawings), and the first connection part 212b connects the first sensor parts 212a to each other in a first direction. The first connection part 210b may be formed integrally with the sensor parts 210a.

The second sensor electrode 220 includes second sensor parts 220a to sense the touch of the input device such as a finger and a second connection part 220b to connect the second sensor parts 220a with each other. The second sensor parts 220a for sensing the touch of the input device such as a finger may be formed in a second direction (Y axis direction of drawings) crossing the first direction. The second connection part 220b may connect the second sensor parts to each other in the second direction.

Some of the first sensor parts 210a and some of the second sensor parts 220a may be disposed on the same plane. Some of the first sensor parts 210a and some of the second sensor parts 220a may be disposed on the substrate 100. Some of the first sensor parts 210a and some of the second sensor parts 220a may be disposed to make direct contact with the substrate 100.

The first connection part 210b is disposed on the substrate 100. The first connection part 210b may be disposed to make direct contact with the substrate 100. In the embodiment, the first connection part 210b, the insulating layer 300, the second connection part 220b and a visibility protective layer 400 may be sequentially laminated on the substrate 100.

Although the first and second sensor parts 210a and 220a are depicted in a rhombus shape in the drawings, the embodiment is not limited thereto. Thus, the first and second sensor parts 210a and 220a may be formed in various shapes to sense the touch of the input device such as a finger. For example, the first and second sensor parts 210a and 220a may have a shape such as a polygonal shape including a rectangular shape or a pentagon shape, a circular shape, or an elliptical shape.

The sensing electrode 200 may include a transparent conductive material that allows electricity to flow therethrough without interrupting transmission of light. To this end, the sensing electrode 200 may include various materials such as indium tin oxide (ITO), indium zinc oxide (IZO), copper oxide, a carbon nano tube (CNT), a nanowire, or graphene.

The sensing electrode 200 may be also formed in a mesh shape. In this case, the sensing electrode 200 may include various metals having excellent electric conductivity. For example, when the sensing electrode 200 may have a mesh shape, the sensing electrode 200 may include Cu, Au, Ag, Al, Ti, Ni or the alloy thereof.

The insulating layer 300 may be disposed between the first and second connection parts 210b and 220b. The insulating layer 300 may prevent the first and second connection parts 210b and 220b from being short-circuited with each other. The insulating layer 300 may be formed of a transparent insulating material capable of insulating the first and second connection parts 210b and 220b from each other. For example, the insulating layer 300 may include metal oxide such as silicon oxide, or acryl resin.

The visibility protective layer 400 may attenuate the reflection of the light in the visible ray band to prevent the glare phenomenon or the blind screen phenomenon caused by the reflection of the light. In other words, the visibility protective layer 400 may effectively reduce the bad affect of the light reflection, thereby improving the resolution and the visibility of the image. In addition, the visibility protective layer 400 may improve the transmittance of the touch panel up to 90% or more, preferably, 92% or more, maximally, 99%.

The visibility protective layer 400 may have a refractive index in the range of 1.35 to 2.7. Preferably, the refractive index of the visibility protective layer 400 may be 1.65 or more. The refractive index may be determined in the range suitable to anti-reflection, and the visibility protective layer 400 may be formed by laminating at least one layer having mutually different refractive indexes.

The difference between the refractive indexes of the sensing electrode 200 and the visibility protective layer 400 may be less than that between the refractive indexes of the sensing electrode 200 and the insulating layer 300. In addition, the difference between the refractive indexes of the sensing electrode 200 and the visibility protective layer 400 may be less than that between the refractive indexes of the sensing electrode 200 and the substrate 100. The difference between the refractive indexes of the sensing electrode 200 and the visibility protective layer 400 may be equal to or less than 0.4. In detail, the difference between the refractive indexes of the sensing electrode 200 and the visibility protective layer 400 may be in the range of 0.00001 to 0.4.

A refractive index of the insulating layer 300 may be in the range of 1.05 to 2.4. Thus, the difference between the refractive indexes of the insulating layer 300 and the visibility protective layer 400 may be equal to or less than 0.3. In detail, the difference between the refractive indexes of the insulating layer 300 and the visibility protective layer 400 may be in the range of 0.00001 to 0.3.

When the difference between the refractive indexes of the visibility protective layer 400 and the sensing electrode 200 and the difference between the refractive indexes of the visibility protective layer 400 and the insulating layer 300 satisfy the values proposed above, the pattern visible phenomenon in the visible ray band may be improved.

The visibility protective layer 400 may include resin composition. In detail, the resin composition may include oligomer, monomer, a photopolymerizable initiator, additives and solvent.

The oligomer may include acrylate oligomer. The acrylate oligomer may include various kinds of acrylate oligomer such as urethane acrylate oligomer, polyester acrylate oligomer, or epoxy acrylate oligomer.

The acrylate monomer may include monomer of alkyl acrylate such as methyl (meth)acrylate, ethyl (meth)acrylate, propyl (meth)acrylate, butyl acrylate, hexyl (meth)acrylate, 2-ethylhexyl (meth)acrylate, lauryl acrylate, or isodecyl acrylate, monomer containing hydroxyl group such as hydroxyethyl (meth)acrylate, hydroxyethyl (meth)methyl acrylate, monomer containing glycidyl group such as glycidyl (meth)acrylate, or monomer containing a nitrogen compound such as acrylamide or acrylonitrile.

The photopolymerizable initiator may include benzionalkylether, benzophenone, benzyldimethylkatal, 1-hydroxy cyclohexyl phenylketone, 1,1-dichloro-acetophenone, 2-chloro-thioxanthone, bis(2,4,6-trimethyl benzoyl) phenyl phosphine oxide, 2,4,6-trimethyl benzoyl diphenyl phosphine (TPO), or 2-hydroxy-2-methyl-1-phenyl-1-propane. The photopolymerizable initiator may include one of the above-mentioned materials, or the mixture thereof.

The additive may include a release agent, a slip agent, a plasticizer, a surfactant or a dispersing agent. The additive may include one of the above-mentioned materials, or the mixture thereof.

In this case, the oligomer, monomer, photopolymerizable initiator and additive may have the content of 50 wt % to 60 wt % based on the whole weight of the resin composition. The solvent may have the content of 40 weight % to 50 weight % based on the whole weight of the resin composition. The visibility may be maximized and the adhesive strength between the visibility protective layer 400 and the substrate 100 may be improved when the weight % described above is adopted.

The embodiment is not limited to the above. The visibility protective layer 400 may include oxide or fluoride. The oxide or fluoride described above may include Mg fluoride, Si oxide, Al oxide, Ce fluoride, In oxide, Hf oxide, Zr oxide, Pb oxide, Ti oxide, Ta oxide, or Nb oxide.

A thickness T of the visibility protective layer 400, that is, the distance from the surface of the substrate 100 to the surface of the visibility protective layer 400 in a portion at which the sensing electrode 200 is formed may be substantially equal to that in another portion at which the sensing electrode 200 is not formed. The thickness T of the visibility protective layer 400 may be in the range of 3 μm to 7 μm. The thickness T of the visibility protective layer 400 may be selected differently according to the refractive index. When the visibility protective layer 400 has a refraction index in the range of 1.35 to 2.7, the reflectivity difference is reduced when the thickness T of the visibility protective layer 400 is in the range of 3 μm to 7 μm, so that the pattern of the sensing electrode 200 may be prevented from being seen.

The visibility protective layer 400 may prevent the pattern of the sensing electrode 200 from being seen. That is, the visibility protective layer 400 may improve the quality of the outer appearance due to the difference between a first area PA in which the sensing electrode 200 is formed and a second area NPA adjacent to the first area PA, that is, an area NPA in which the sensing electrode 200 is not formed. In addition, the visibility protective layer 400 may be disposed at the outmost layer of the touch window. In this case, the touch window may be protected from external environment.

Meanwhile, when the visibility protective layer 400 is formed, the reflectivity difference between the first area PA in which the sensing electrode 200 is formed and the second area NPA in which the sensing electrode is not formed may be equal to or less than 5%. Preferably, when the visibility protective layer 400 is formed, the reflectivity difference in the visible ray band between the first area PA and the second area NPA may be in the range of 0.00001% to 5%. When the reflectivity difference exceeds 5%, the pattern of the sensing electrode 200 may be seen.

The wire 250 may be disposed in the unactive area UA for the purpose of an electrical connection of the sensing electrode 200. The wire 250 may include a metal having excellent electrical conductivity. For example, the wire 250 may include Cr, Ni, Cu, Al, Ag and Mo, and the alloy thereof. Specifically, the wire 250 may include various metallic paste materials which may form the wire 250 through a printing process.

An electrode pad is placed at an end of the wire 250. The electrode pad may be connected to a printed circuit board. In detail, although not shown in the drawings, a connecting terminal may be placed on one surface of the printed circuit board and the electrode pad may be connected to the connecting terminal. The electrode pad may be formed to have a size corresponding to the connecting terminal.

Various types of printed circuit boards may be applied as the printed circuit board. For example, a flexible printed circuit board (FPCB) may be applied as the printed circuit board.

Figure 4:
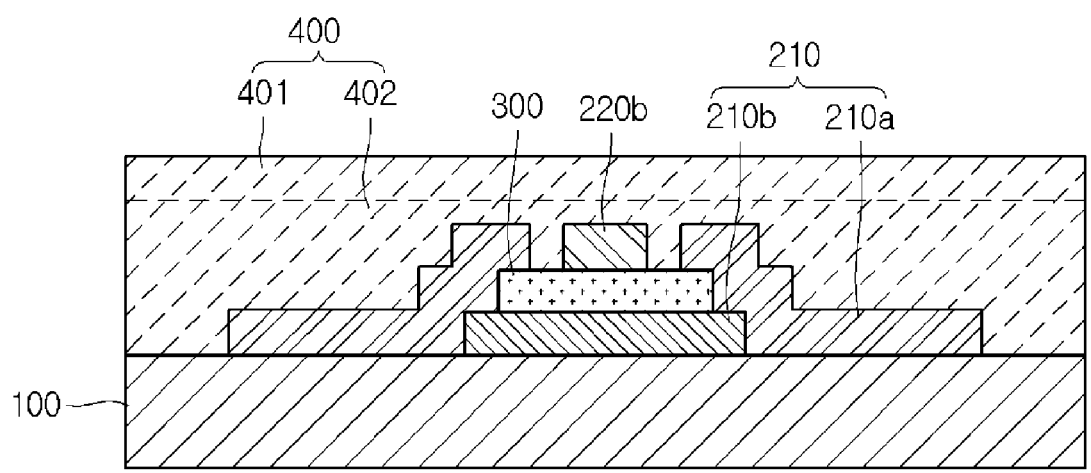
FIGS. 4 and 5 are sectional views showing a touch window according to another embodiment.

Referring to FIG. 4, the visibility protective layer of a touch window according to another embodiment may include two layers. That is, the visibility protective layer 400 may include a first visibility protective layer 401 having a first refractive index and a second visibility protective layer 402 having a second refractive index. In this case, the second refractive index is higher than the first refractive index.

The second visibility protective layer 402 having a relatively higher refractive index and the first visibility protective layer 401 having a relatively lower refractive index may be sequentially formed on the substrate 100, so that the reflection may be prevented and the transmittance of the touch window may be improved in the active area AA. The refractive index may be reduced and the transmittance may be improved by using interference effect derived from variations of the wavelength and intensity of light according to the refractive indexes and thicknesses of the first and second visibility protective layers 401 and 402.

The first visibility protective layer 401 may include $Al_2O_3$, $CeF_3$, $SiO$, $In_2O_3$, or $HfO_2$. The refractive index of $Al_2O_3$ may be equal to 1.62, the refractive index of $CeF_3$ may be equal to 1.63, and the refractive indexes of $SiO$, $In_2O_3$ and $HfO_2$ may be equal to 2.00, respectively.

The second visibility protective layer 402 may include $ZrO_2$, $Pb_5O_{11}$, $TiO_2$, $Ta_2O_5$, $Nb_2O_5$, or $TiO_2$. The refractive index of $ZrO_2$ may be equal to 2.10. When $ZrO_2$ may be used together with $Pb_5O_{11}$ and $TiO_2$, the refractive index may be equal to 2.10. The refractive index of $Ta_2O_5$ may be equal to 2.15. The refractive index of $Nb_2O_5$ may be equal to 2.2~2.4. The refractive index of $TiO_2$ may be equal to 2.2~27.

Although the single first visibility protective layer 401 and the single second visibility protective layer 402 are only shown in the drawings, the embodiment is not limited thereto, and a plurality of the first visibility protective layers 401 and a plurality of the second visibility protective layer 402 may be alternately stacked.

Although the first visibility protective layer 401 having a relatively lower refractive index is formed after the second visibility protective layer 402 having a relatively higher refractive index is formed in the embodiment, the embodiment is not limited thereto. The second visibility protective layer 402 having a relatively higher refractive index may be formed after the first visibility protective layer 401 having a relatively lower refractive index is formed.

Figure 5:
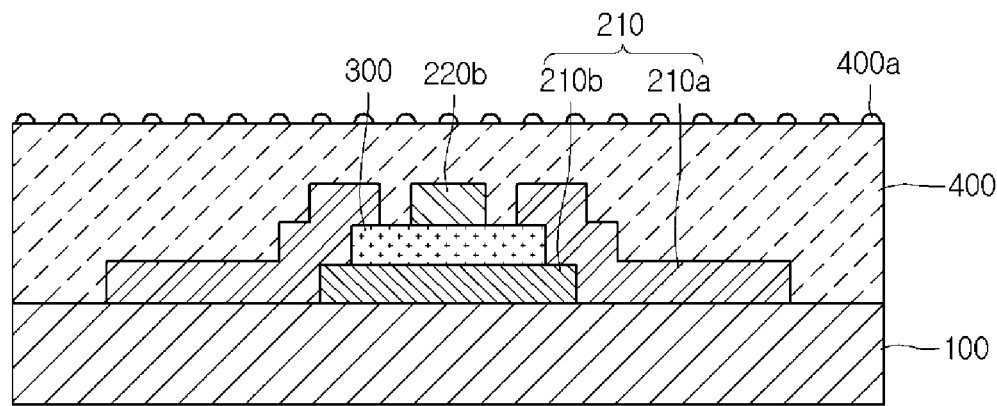

Referring to FIG. 5, a fine protrusion 400a may be disposed on a top surface of the visibility of protective layer 400 of the touch window according to another embodiment. A plurality of fine protrusions 400a is provided on the top surface of the visibility protective layer 400 such that the protection against reflection may be achieved. In this case, the fin protrusions 400a may include a material equal or similar to that of the visibility protective layer 400.

The arrangement of the fine protrusions 400a may be called a moth-eye structure. This structure is achieved based on the fact that the eye of a nocturnal insect such as a moth does not reflect light regardless of an incidence angle and a wavelength of light. According to the observation result for the moth eye by using an electron microscope, a plurality of protrusions are arranged and the arrangement of the fine protrusions 400a has been made by utilizing such a structure.

Figure 6:
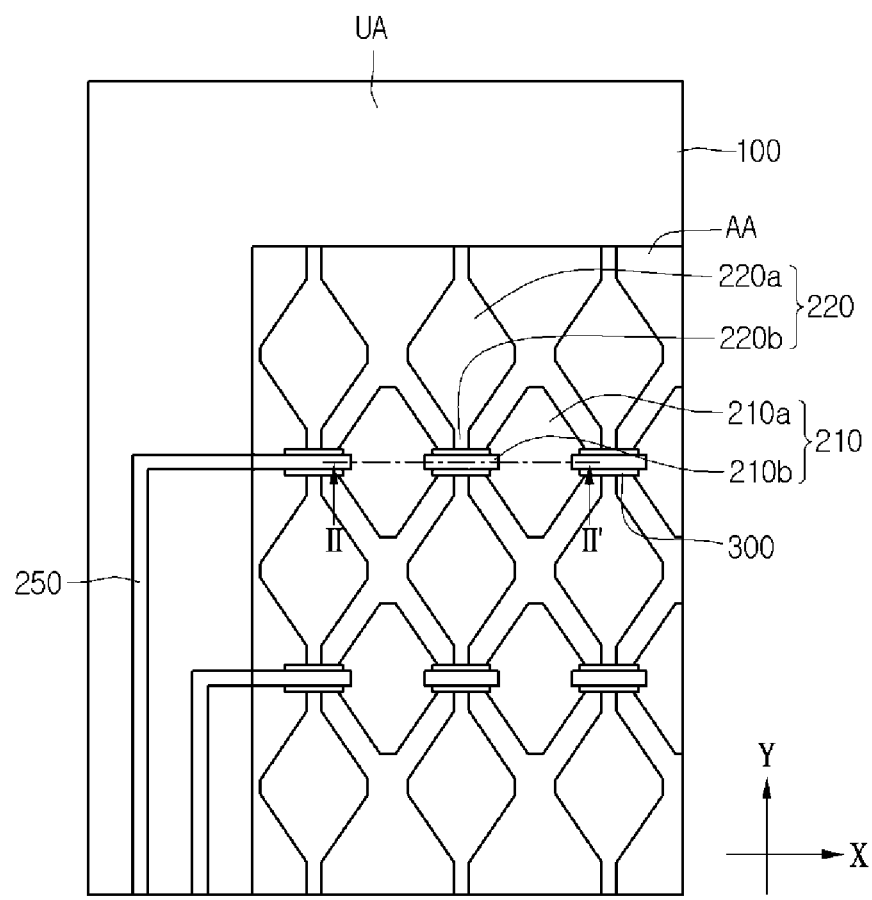
FIG. 6 is a plane view showing a touch window according to still another embodiment.
Figure 7:
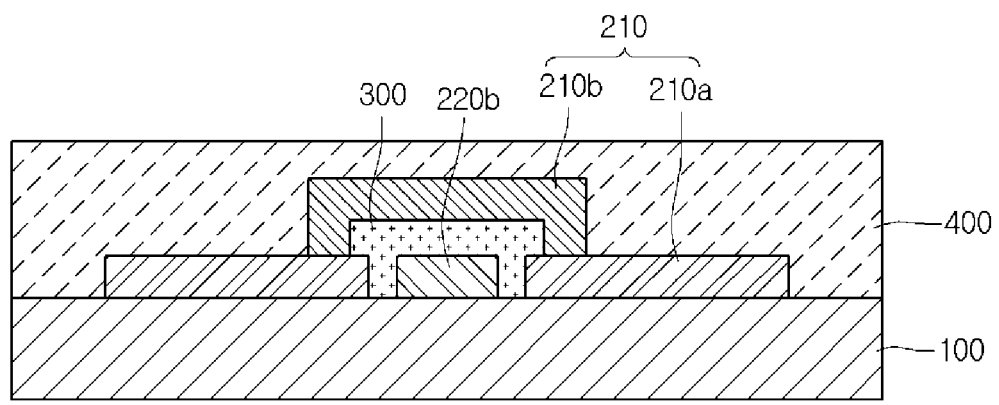
FIG. 7 is a sectional view taken along line II-II' of FIG. 6.

Referring to FIGS. 6 and 7, a touch window according to another embodiment includes first and second sensing parts 210a and 220a and a second connection part 220b which are provided on a substrate 100. The first and second sensing parts 210a and 220a and the second connection part 220b may be disposed on the substrate 100 while making direct contact with the substrate 100. The first and second sensing parts 210a and 220a and the second connection part 220b are disposed on the same plane.

An insulating layer 300 may be disposed on the second connection part 220b and a first connection part 210b for connecting the first sensing parts 210a to each other may be disposed on the insulating layer 300. The first and second sensing parts 210a and 220a and the second connection part 220b, the insulating layer 300, the first connection part 210b, and a visibility protective layer 400 may be sequentially stacked.

Figure 8:
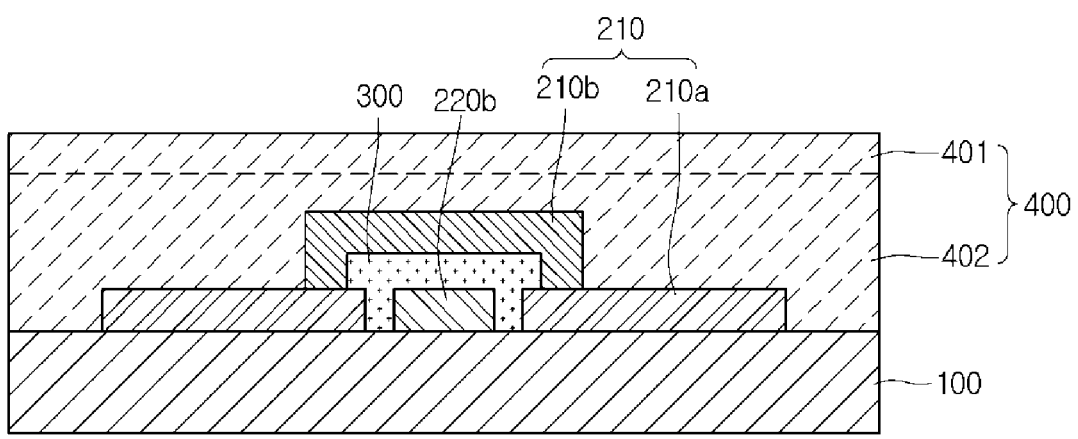
FIGS. 8 and 9 are sectional views showing a touch window according to still another embodiment.
Figure 9:
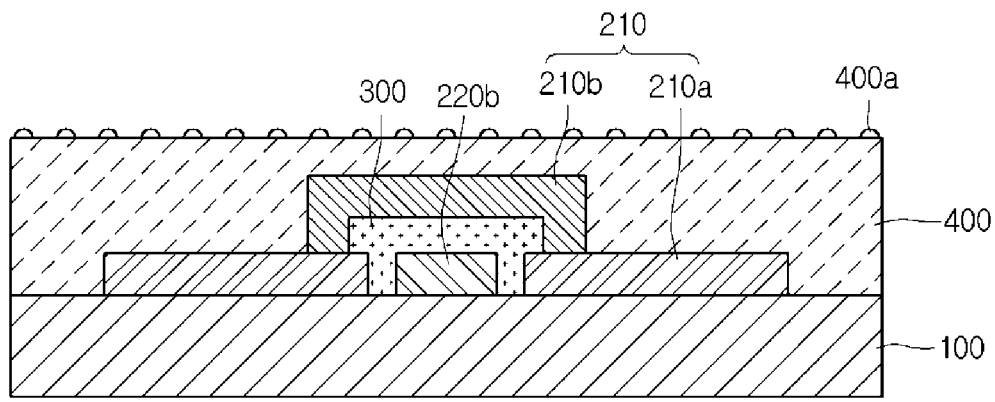

Referring to FIG. 8, in the touch window having the structure of FIG. 7, the visibility protective layer 400 may include first and second visibility protective layers 401 and 402. Referring to FIG. 9, a find protrusion 400a may be provided on the visibility protective layer 400.

Figure 10:
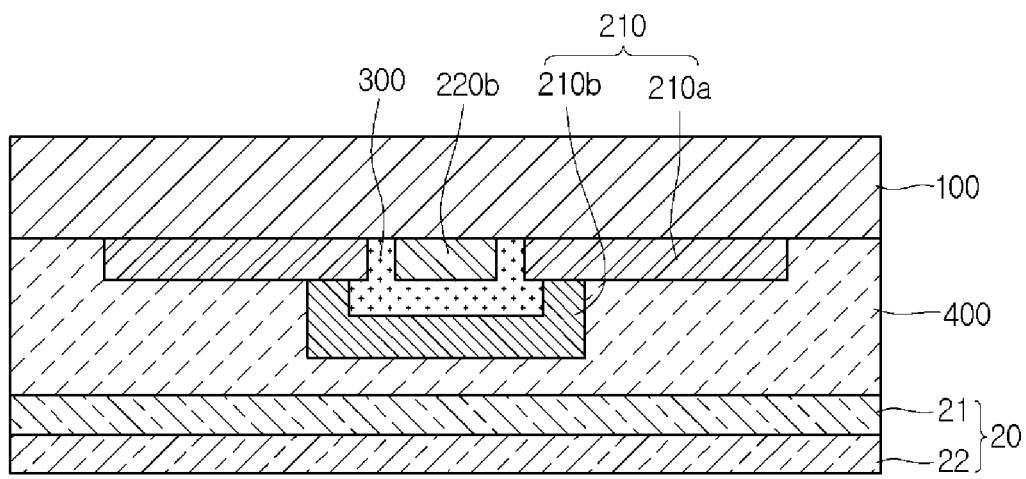
FIG. 10 is a sectional view showing a display apparatus in which a touch window according to an embodiment is provided on a driver.

As illustrated in FIG. 10, the touch window 10 may be disposed on a display panel 20 serving as a driver. The touch window 10 may be combined with the display panel 20, so that a display apparatus may be implemented.

A display region to output an image is formed in the display panel 20. A display panel applied to the display device may generally include an upper substrate 21 and a lower substrate 22. A data line, a gate line and a thin-film transistor (TFT) may be formed in the lower substrate 22. The upper substrate 21 may be adhesive to the lower substrate 22 such that the elements provided on the lower substrate 22 may be protected.

The display panel 20 may be formed in various types according to the type of display apparatus. That is, the display apparatus according to the embodiment may include a liquid-crystal device (LCD), a field emission display, a plasma display panel (PDP), an organic light-emitting diode (OLED), and an electronic paper display (EPD). Thus, the display panel 20 may be implemented in various types.

The embodiment provides a touch window having improved visibility and a display apparatus including the same.

According to the embodiment, there is provided a touch window includes a substrate; a sensing electrode on the substrate, the sensing electrode including a first sensing electrode and a second sensing electrode; an insulating layer between the first and second sensing electrodes; and a visibility protective layer on the sensing electrode, wherein a difference between refractive indexes of the sensing electrode and the visibility protective layer is less than a difference between refractive indexes of the sensing electrode and the insulating layer.

The touch window according to the embodiment includes the visibility protective layer so that the visibility protective layer may prevent the pattern of the sensing electrode 200 from being seen. That is, the visibility protective layer may improve the quality of the outer appearance due to the difference between the area in which the sensing electrode is formed and the area in which the sensing electrode is not formed. In addition, the visibility protective layer may be disposed at the outmost layer of the touch window, so that the touch window may be protected from external environment.

When the visibility protective layer is formed, the reflectivity difference between the area in which the sensing electrode is formed and the area in which the sensing electrode is not formed may be equal to or less than 5%. Preferably, when the visibility protective layer is formed, the reflectivity difference between the area in which the sensing electrode is formed and the area in which the sensing electrode is not formed may be equal to or less than 2%.

It will be understood that, when a layer (film), a region, a pattern or a structure is referred to as being "on" or "under" a substrate, another layer (film), region, pad or patterns, it can be "directly" or "indirectly" on the other layer (film), region, pattern or structure, or one or more intervening layers may also be present. Such a position of each layer described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch window comprising:
a cover substrate having an active area and an inactive area;
a sensing electrode provided over the cover substrate, the sensing electrode including a first sensing electrode and a second sensing electrode;
an insulating layer provided between the first and second sensing electrodes;
a visibility protective layer provided over the sensing electrode; and
a display panel on the visibility protective layer,
wherein a difference between a refractive index of the sensing electrode and a refractive index of the visibility protective layer is less than a difference between the refractive index of the sensing electrode and a refractive index of the insulating layer,
wherein a thickness of the visibility protective layer is greater than a thickness of the first sensing electrode and the second sensing electrode,
wherein the visibility protective layer directly contacts an upper surface of the first sensing electrode and an upper surface of the second sensing electrode,
wherein a reflectivity difference between a first area in which the sensing electrode is formed and a second area which is adjacent to the first area is in a range of 0.00001% to 2%,
wherein the first sensing electrode includes a first sensing part and a first connector to connect the first sensing part with another first sensing part, the first connector directly contacting the substrate,
wherein the second sensing electrode includes a second sensing part and a second connector to connect the second sensing part with another second sensing part, wherein the first connector is disposed to make direct contact with the cover substrate,
wherein a bottom surface of the visibility protective layer directly contacts the first sensing part, the second sensing part, the second connector, the insulating layer, and the cover substrate,
wherein the sensing electrode is provided between the visibility protective layer and the cover substrate,
wherein the visibility protective layer has a thickness in a range of 3 μm to 7 μm and a refraction index in the range of 1.35 to 2.7,
wherein a distance from a surface of the cover substrate to a surface of the visibility protective layer in a portion at which the first area is formed is substantially equal to that in another portion at which the second area is formed,
wherein the visibility protective layer includes resin composition,
wherein the resin composition of the visibility protective layer includes oligomer, monomer, a photo initiator, an additive, and a solvent,
wherein the first sensing part extends from the cover substrate to a top surface of the insulating layer,
wherein the second connection part is disposed on the top surface of the insulating layer,
wherein a top surface of the visibility protective layer is substantially parallel to a top surface of the cover substrate, and
wherein a plurality of fine protrusions having a moth-eye structure are disposed on the top surface of the visibility protective layer.

2. The touch window of claim 1, wherein the difference between the refractive indexes of the sensing electrode and the insulating layer is less than a difference between the refractive index of the sensing electrode and a refractive index of the cover substrate.

3. The touch window of claim 1, wherein the difference between the refractive indexes of the sensing electrode and the insulating layer is in a range of 0.00001 to 0.4.

4. The touch window of claim 1, wherein the insulating layer is provided between the first and second connectors.

5. The touch window of claim 1, wherein the first and second sensing parts are provided on a same plane.

6. The touch window of claim 4, wherein the first connectors, the second connectors and the visibility protective layer are sequentially stacked on the cover substrate.

7. The touch window of claim 4, wherein the second connectors, the insulating layer, the first connectors and the visibility protective layer are sequentially stacked on the cover substrate.

8. The touch window of claim 4, wherein a difference between the refractive indexes of the insulating layer and the visibility protective layer is in a range of 0.00001 to 0.3.

9. The touch window of claim 1, wherein the refractive index of the visibility protective layer is equal to or more than 1.65.

10. The touch window of claim 1, wherein the refractive index of the visibility protective layer is in a range of 1.65 to 3.

11. The touch window of claim 1, wherein the oligomer, monomer, photopolymerizable initiator and additive have a content of 50 wt % to 60 wt % based on a whole weight of the resin composition.

12. The touch window of claim 1, wherein the visibility protective layer includes at least one selected from the group consisting of Ta oxide, Ti oxide, Nb oxide, Zr oxide and Pb oxide.

13. The touch window of claim 1, wherein the visibility protective layer includes:
    a first visibility protective layer having a first refractive index; and
    a second visibility protective layer having a refractive index higher than the first refractive index.

14. The touch window of claim 1, wherein the visibility protective layer is provided on an entirety of the active area of the cover substrate.

15. The touch window of claim 1, wherein the reflectivity difference between the first area in which the sensing electrode is formed and the second area which is adjacent to the first area is in a range of 0.00001% to 1%.

* * * * *